(12) United States Patent
Ouchi

(10) Patent No.: US 6,749,050 B2
(45) Date of Patent: Jun. 15, 2004

(54) ONE-WAY CLUTCH BUILT-IN TYPE PULLEY DEVICE

(75) Inventor: Hideo Ouchi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/221,859

(22) PCT Filed: Jun. 26, 2001

(86) PCT No.: PCT/JP01/05473

§ 371 (c)(1),
(2), (4) Date: Dec. 31, 2002

(87) PCT Pub. No.: WO02/02967

PCT Pub. Date: Jan. 10, 2002

(65) Prior Publication Data

US 2003/0141161 A1 Jul. 31, 2003

(30) Foreign Application Priority Data

Jul. 3, 2000 (JP) ........................ 2000-200623

(51) Int. Cl.$^7$ ..................... F16H 55/36; F02D 29/06
(52) U.S. Cl. ..................... 192/45; 192/110 B
(58) Field of Search ............... 192/45, 110 B; 474/199, 17; 384/94, 124, 130

(56) References Cited

U.S. PATENT DOCUMENTS

| | | | | |
|---|---|---|---|---|
| 4,571,227 A | * | 2/1986 | Colanzi et al. | 474/199 |
| 5,675,202 A | * | 10/1997 | Zenmei et al. | 310/100 |
| 6,093,991 A | * | 7/2000 | Tanaka | 310/100 |
| 6,116,393 A | * | 9/2000 | Ooitsu et al. | 192/45 |
| 6,138,804 A | * | 10/2000 | Tazumi et al. | 192/45 |
| 6,170,625 B1 | * | 1/2001 | Tanaka | 192/45 |
| 6,588,560 B1 | * | 7/2003 | Fujiwara | 192/45 |

FOREIGN PATENT DOCUMENTS

| | | |
|---|---|---|
| JP | 10184853 | 7/1998 |
| JP | 11230314 | 8/1999 |
| JP | 2000130563 | 5/2000 |

* cited by examiner

Primary Examiner—Saúl J. Rodriguez
(74) Attorney, Agent, or Firm—Crowell & Moring LLP

(57) ABSTRACT

A pair of collar sections 30a, 30b are formed on both ends in the axial direction of the outer ring 29 for the one-way clutch 10 to protrude radially inwards. The inner diameter $D_{30}$ of the collar sections 30a, 30b is greater than the outer diameter $D_{33}$ of the axially oppoite ends of the clutch retainer 16 of the one way clutch 10. The diameter ($d_{16}$) of the inscribed circle on the inner peripheral surface on both ends in the axial direction of the one-way clutch 10 is less than the outer diameter ($D_{19}$) of both ends in the axial direction of the inner bearing races 19 of the support bearing 9 provided on the both side of the one-way clutch 10 ($d_{16}<D_{19}$). The inner bearing races 19 are fitted onto and fixed by the outer peripheral surface at the opposite end portions in the axial direction of the sleeve 8.

2 Claims, 4 Drawing Sheets

ONE-WAY CLUTCH BUILT-IN TYPE PULLEY DEVICE

BACKGROUND OF THE INVENTION

1. Field of the Invention

This invention relates to a pulley apparatus with built-in one-way clutch.

2. Description of the Related Art

A pulley apparatus with built-in one-way clutch is fastened to the end of the rotating shaft of an alternator in the generator of an automobile, for example, to drive the alternator by running an endless belt between the drive pulley attached to the end of the engine crankshaft and the pulley apparatus with built-in one-way clutch.

The construction of the alternator, which generates the power required for the automobile using as the drive source the engine for running the automobile, is disclosed for example in Japanese Patent Publication No. Toku Kai Hei 7-139550. FIG. 3 shows the alternator 1 disclosed in this publication. This alternator 1 comprises a housing 2, and rotating shaft 3 on the inside of the housing 2. The rotating shaft 3 is supported by a pair of rolling bearings 4 such that it rotates freely. There is a rotor 5 and commutator 6 in the middle of the rotating shaft 3. Also, a pulley 7 is fixed to one end (right end in FIG. 3) of the rotating shaft 3 on the section that protrudes to the outside of the housing 2. When installed in an engine, an endless belt is extended around this pulley 7 and the engine crankshaft drives the rotating shaft 3.

Conventionally, a pulley 7 was simply fixed to the rotating shaft 3. However, recently, various kinds of one-way clutch built-in pulleys for alternators have been proposed, wherein when the running speed of the endless belt is constant or increasing, power is freely transmitted from the endless belt to the rotating shaft, and when the running speed of the endless belt is decreasing, the relative rotation between the pulley and the rotating shaft is free, and these pulleys are being used in some applications. For example, a one-way clutch built-in pulley for an alternator as described above has been disclosed in Japanese Patent Publications Nos. Toku Kai Sho 56-101353, Toku Kai Hei 8-226462, Toku Kai Hei 9-229097, Toku Kai Hei 11-22753, Toku Kai Hei 11-159599, Toku Ko Hei 7-72585, and French patent FR2726059A1 etc. Also, this kind of pulley apparatus with built-in one-way clutch for an alternator is actually being used in some applications.

FIG. 4 shows the pulley apparatus with built-in one-way clutch for an alternator that is disclosed in Japanese Patent Publication No. Toku Kai Hei 11-22753. This pulley apparatus with built-in one-way clutch for an alternator has a sleeve 8 that can be fitted over the tip end of the rotating shaft 3 (see FIG. 3) of the alternator 1. In addition, there is a pulley 7 located around this sleeve 8 such that it is concentric with the sleeve 8. There is a pair of support bearings 9 and the one-way clutch 10 located between the outer peripheral surface of the sleeve 8 and the inner peripheral surface of the pulley 7.

The support bearings 9 support radial loads that are applied to the pulley 7, while at the same time make it possible for free relative rotation between the sleeve 8 and pulley 7.

The one-way clutch 10 transmits rotation power from the pulley 7 to the sleeve 8 only when the pulley 7 rotates in a specified direction with respect to the sleeve 8.

The one-way clutch 10 has an inner ring 11 for the one-way clutch that is fitted onto and fixed around the middle section in the axial direction of the sleeve 8. There is a plurality of depressions 12, called ramp sections, are formed at uniform intervals all the way around in the circumferential direction on the outer peripheral surface of the inner ring 11 for the one-way clutch. This outer peripheral surface functions as a cam surface 13. In contrast to this, there is an outer ring 14 that is fitted into and fixed around the inner peripheral surface of pulley 7. The middle section in the axial direction of this outer ring 14 functions as the outer ring for the aforementioned one-way clutch 10. Therefore, the inner peripheral surface of the middle section in the axial direction of the outer ring 14 is simply a cylindrical surface generally along its entire length in the axial direction. The one-way clutch 10 comprises the middle section in the axial direction of the outer ring 14, the inner ring 11 for the one-way clutch and a plurality of rollers 15. The plurality of rollers 15 are supported by a clutch retainer 16 such that they rotate freely and can displace a little in the circumferential direction. In addition, there are springs between the column sections of the clutch retainer 16 and the rollers 15. A cylindrical-shaped space is formed between the outer peripheral surface of the cam surface 13 and the inner peripheral surface in the middle section in the axial direction of the outer ring 14. In the cylindrical-shaped space, the springs elastically press against the rollers 15 in the direction of the section where the width in the radial direction becomes narrow.

On the other hand, outer bearing races 18 for the support bearings 9 are fitted around the inner peripheral surfaces of the sections near both ends in the axial direction of the outer ring 14 that is fitted and fixed around the inner peripheral surface of the pulley 7, and inner bearing races 19 for the support bearings 9 are fitted around the outer peripheral surfaces of the sections on both ends in the axial direction of the sleeve 8. Also, a plurality of rolling elements (balls) 22 are located between the outer-ring raceways 20 that are formed around the inner peripheral surfaces of the outer bearing races 18, and the inner-ring raceways 21 that are formed around the outer peripheral surfaces of the inner bearing races 19.

Moreover, an attachment protrusion 17 protruding radially inward is formed part way around in the circumferential direction on the inner peripheral surface of one end (right end in FIG. 4) in the axial direction of the clutch retainer 16. This attachment protrusion 17 is held between the end surface of the inner ring 11 for the one-way clutch and the end surface of the inner bearing race 18 of one of the support bearings (right bearing in FIG. 4).

The reason for using a pulley apparatus with built-in one-way clutch for an alternator is as follows. There are changes in rotation speed of the engine crankshaft when firing occurs, and in the case of a diesel engine or direct-injection gasoline engine, changes in rotational angular speed of the crankshaft become especially large at low rotational speed such as during idling. As a result, the running speed of the endless belt 23 that extends around the drive pulley that is fastened to the end of the crankshaft also changes small. On the other hand, the rotating shaft 3 of the alternator 1 is rotated and driven by the endless belt 23 by way of the pulley 7, and there is no sudden change due to the inertial mass of the rotating shaft 3 and the rotor 5 and commutator 6 (see FIG. 3) that are fastened to the rotating shaft 3. Therefore, when the pulley 7 is simply fastened to the rotating shaft 3, the number of revolution of the rotating shaft 3 decreases as is when the running speed of the belt drops, so that the generating efficiency of the alternator decreases. At the same time, there is a tendency for rubbing in both directions between the endless belt 23 and the pulley 7 due to the change in the rotational angular speed of the crankshaft.

As a result, stress that repeatedly changes direction acts on the endless belt 23 that it rubs with the pulley 7, and thus slipping occurs easily between this endless belt 23 and pulley 7, or causes the life of the endless belt 23 to be shortened.

Moreover, the drop in the generating efficiency of the alternator 1 described above, and the decrease in life of the endless belt 23 due to friction between the outer peripheral surface of the pulley 7 and the inner peripheral surface of the endless belt 23 are also caused by repeatedly accelerating or decelerating during operation. In other words, during acceleration, the drive force is transmitted from the endless belt 23 to the pulley 7, and during deceleration the endless belt 23 applies a braking force on the pulley 7 that tries to continue rotating due to inertia. Not only does the generation efficiency decrease due to this braking force, but this braking force and the drive force act as an opposite direction friction force on the inner peripheral surface of the endless belt 23, and therefore decreases the life of the endless belt 23.

Particularly, in the case of a vehicle equipped with an exhaust brake, the deceleration that slows the rotation of the crankshaft when acceleration is off becomes large, and the friction force that is applied to the inner peripheral surface of the endless belt 23 due to the braking force becomes large, so as a result there is a large decrease in generating efficiency and life.

Here, a pulley apparatus with built-in one-way clutch is used as the pulley 7 described above. There is a cylindrical space formed between the outer peripheral surface of the inner ring 11 for the one-way clutch and the inner peripheral surface in the middle section in the axial direction of the outer ring 14. When the running speed of the endless belt 23 is constant or increasing, the rollers 15 of the one-way clutch 10 bite into the section of the cylindrical space where the width in the radial direction becomes narrow, or in other words, they become locked such that rotating power can be freely transmitted from the pulley 7 to the rotating shaft 3. Conversely, when the running speed of the endless belt 23 decreases, the rollers 15 move into the section of the cylindrical space where the width is large such that they can rotate freely, or in other words, they are in the overrun state such that the pulley 7 rotates freely with respect to the rotating shaft 3.

In other words, when the running speed of the endless belt 23 is decreasing, the rotational angular speed of the pulley 7 is slower than the rotational angular speed of the rotating shaft 23, which prevents strong rubbing at the point of contact between the endless belt 23 and the pulley 7. In this way, the generating efficiency of the alternator is maintained, and the direction of the stress acting on the section of contact between the pulley 7 and the endless belt 23 is constant, preventing slipping to occur between the endless belt 23 and pulley 7, and preventing a decrease in the life of the endless belt 23.

Moreover, in the case of the pulley apparatus with built-in one-way clutch shown in FIG. 4, an attachment protrusion 17 is formed in the circumferential direction around part of the inner peripheral surface on one end in the axial direction of the clutch retainer, and is held between the end surface of the inner ring 11 of the one-way clutch and the end surface (right end in FIG. 4) of the inner bearing race 19 of one of the support bearings 9. Therefore, it is possible to prevent displacement in the axial direction of the clutch retainer 16, and it is possible to cause the clutch retainer 16 to rotate together with the sleeve 8.

In addition, when using the pulley apparatus with built-in one-way clutch, it is possible to prevent sliding contact with the member (such as the outer bearing race 18) that rotates relative to the clutch retainer 16 due to displacement of the clutch retainer 16 in the axial direction, as well as it is possible to prevent heat that is generated due to this sliding contact. Therefore, it is possible to prevent heat degradation of the grease inside the pulley apparatus with built-in one-way clutch as well as prevent heat deformation of the clutch retainer 16.

Also, construction of combining a bearing unit together with a one-way clutch, in which the outer peripheral surface of the inner ring for the one-way clutch or the sleeve is a simple cylindrical surface, and in which the inner peripheral surface of the outer ring of the one-way clutch is a cam surface is disclosed in Japanese Patent Publication No. Jitu Ko Hei 5-42268 and Japanese Patent Publication Toku Kai Hei No. H7-317808.

In the case of Japanese Patent Publication No. Jitu Ko Hei 5-42268, the protrusion that is formed around the outer peripheral surface on the end in the axial direction of the clutch retainer of the one-way clutch is engaged in a groove section that is formed around the inner peripheral surface of the outer ring for the one-way clutch.

In the case of the construction disclosed in Japanese Patent Publication No. Toku Kai Hei 7-317808, a collar section is formed around the outer peripheral surface on the end in the axial direction of the clutch retainer, and held between the outer ring for the one-way clutch and the support bearing, which is a sliding bearing.

With the construction in either of these publications, it is possible to prevent the clutch retainer from displacing in the axial direction in the same way as in the prior art construction shown in FIG. 3.

In the case of the prior art construction, there is a possibility that the following problems may occur. First, in the case of the construction disclosed in Japanese Patent Publication No. Toku Kai Hei 11-22753 and the construction disclosed in Japanese Patent Publication No. Toku Kai Hei 7-317808 and shown in FIG. 4, it is difficult to handle all of the components of the one-way clutch 10 as one body before the one-way clutch 10 is installed in the pulley apparatus.

For example, in the case of the construction disclosed in Japanese Patent Publication No. Toku Kai Hei 11-22753, neither the outer ring 14 nor the inner ring 11 for the one-way clutch are constructed for preventing the clutch retainer 16 from displacing in the axial direction. Therefore, when handling the one-way clutch 10 separately, it is easy for the clutch retainer 16 and the plurality of rollers 15 that are held by the clutch retainer 16 to come out from the outer ring 14 and the inner ring 11 for the one-way clutch.

Also, in the case of the construction disclosed in Japanese Patent Publication No. Toku Kai Hei 7-317808, the sleeve functions as the inner race of the support bearings or the inner ring of the one-way clutch, so it is not possible to handle the one-way clutch separately. Therefore, in the case of the construction described in these publications, assembly work becomes troublesome.

Moreover, the construction disclosed in Japanese Patent Publication No. Jitu Ko Hei 5-42268 and the construction disclosed in Japanese Patent Publication No. Toku Kai Hei 7-317808 is not suitable for use on the alternator pulley. The reason for this is as follows. In the case of the construction described in these publications, the cam surface is formed on the inner peripheral surface of the outer ring of the one-way clutch instead of the outer peripheral surface of the inner ring (or sleeve) of the one-way clutch. The rollers of the one-way clutch are pressed elastically by a plurality of springs toward the section of the cylindrical space between the cam surface and the outer peripheral surface of the inner ring (or sleeve) of the one-way clutch that becomes narrow in the radial direction. Also, when the pulley rotates in a specified direction relative to the sleeve, the rollers are locked, and when the pulley rotates in the opposite direction relative to the sleeve, the rollers are in the overrun state.

However, when the construction disclosed in Japanese Patent Publication No. Jitu Ko Hei 5-42268 or the construction disclosed in Japanese Patent Publication No. Toku Kai Hei 7-317808 is used in the pulley apparatus for driving an auxiliary engine device such as the alternator, the movement of the rollers, due to the centrifugal force acting on the rollers that occurs due to the rotation of crankshaft or alternator rotating shaft, becomes unstable. In other words, the rotational speed of the crankshaft or rotating shaft changes greatly, and so the magnitude of the centrifugal force also changes greatly.

The centrifugal force acting on the rollers in this way presses the rollers against the bottom surfaces of the grooves of the cam surface, and as a result, generates a component force in the direction that causes the rollers to displace along the bottom surface of the grooves. Also, when the rotational speed of the crankshaft or rotating shaft changes in this way, the magnitude of the component force due to the centrifugal force also changes, and the elastic force of the springs required for pressing the rollers is no longer constant.

Therefore, it is not possible to securely obtain a locked state, and during the overrun state, the elastic force applied to each of the rollers becomes too large, and there is a possibility that abnormal heat will be generated due to sliding contact between the rollers and the outer peripheral surface of inner ring of the one-way clutch (or sleeve), or between the rollers and the inner peripheral surface of the outer ring of the one-way clutch.

It is difficult to assemble and use the construction disclosed in Japanese Patent Publication No. Jitu Ko Hei 5-42268 and the construction disclosed in Japanese Patent Publication No. Toku Kai Hei 7-317808 in an auxiliary drive pulley apparatus such as an alternator without the problems described above occurring.

This invention was invented taking the above problems into consideration.

DISCLOSURE OF THE INVENTION

Similar to the prior art construction shown in FIG. 4, the pulley apparatus with built-in one-way clutch of this invention comprises: a sleeve that can be connected and fixed to the tip end of the rotating shaft; a pulley that is located around this sleeve such that it is concentric with the sleeve; a one-way clutch, which is located in the space between the middle section in the axial direction of the outer peripheral surface of the sleeve and the middle section in the axial direction of the inner peripheral surface of the pulley such that it freely transmits rotating power between the pulley and sleeve only when the pulley rotates in a predetermined direction relative to the sleeve; and a pair of support bearings that are located on both sides in the axial direction of the one-way clutch in the space between the outer peripheral surface of the sleeve and the inner peripheral surface of the pulley such that they support the radial load applied to the pulley and make it possible for the sleeve and pulley to rotate freely with respect to each other.

One feature of the pulley apparatus with built-in one-way clutch of this invention is that the one-way clutch is a roller clutch comprising: an outer ring for the one-way clutch that is fitted into and fixed around the inner peripheral surface in the middle section in the axial direction of the pulley; an inner ring for the one-way clutch that is fitted onto and fixed around the outer peripheral surface in the middle section in the axial direction of the sleeve; and a plurality of rollers that are held by a clutch retainer between the outer ring and inner ring for the one-way clutch. The support bearings have inner bearing races that are fitted onto and fixed around the outer peripheral surfaces on both end in the axial direction of the sleeve. Also, the diameter of the inscribed circle of the inner peripheral surface on both ends in the axial direction of the clutch retainer is less than the outer diameter of the end surface in the axial direction of the inner bearing race that faces the clutch retainer.

Another feature of the pulley apparatus with built-in one-way clutch of this invention is that the one-way clutch is a roller clutch comprising: an outer ring for the one-way clutch that is fitted into and fixed around the inner peripheral surface in the middle section in the axial direction of the pulley and has a pair of collar sections that are formed, protruding to the inner-diameter side, on both ends in the axial direction; an inner ring for the one-way clutch that is fitted and fixed around the outer peripheral surface in the middle section in the axial direction of the sleeve, and such that the outer peripheral surface of the inner ring forms a cam surface defined by a plurality of concave grooves that are formed such that the depth in the radial direction becomes larger toward a specified circumferential direction; and a plurality of rollers that are held by a clutch retainer between the outer ring and inner ring for the one-way clutch. Each of the support bearings has an inner bearing race that is fitted onto and fixed around the outer peripheral surfaces closer to both ends in the axial direction of the sleeve.

Also, the inner diameters of the collar sections of the outer ring for the one-way clutch are larger than the outer diameter of the end in the axial direction of the clutch retainer, which is located on the same side as these collars, and the diameter of the inscribed circle on the inner peripheral surface of both ends in the axial direction of the clutch retainer is less than the outer diameter of the end surface in the axial direction of the inner bearing race that faces the clutch retainer.

In the case of the pulley apparatus with built-in one-way clutch of this invention that is constructed as described above, it is possible to regulate the displacement of the clutch retainer of the one-way clutch in the axial direction by the inner bearing races of the support bearings. Therefore, it is possible to prevent the clutch retainer from rubbing against the other components such as the outer ring for the one-way clutch without having to form the clutch retainer into a special shape. Also, it is possible to suppress friction heat that occurs during overrun, so it is possible to prevent heat degradation of the lubrication grease inside the clutch and heat deformation of the components of the clutch.

Furthermore, in the case of this invention, there is a pair of collar sections, protruding to the inner-diameter side, on both ends in the axial direction of the outer ring for the one-way clutch, so before the one-way clutch is installed in the pulley apparatus, the components of the one-way clutch can be handled substantially as one body. Since the one-way clutch can be handled easily, it is possible to improve the ability to install the one-way clutch built-in one-way clutch for an alternator. Also, in the case of this invention, there is a cam surface formed around the outer peripheral surface of the inner ring for the one-way clutch, so during operation, it is possible to stabilize the locked state and overrun state while at the same time suppressing the generation of heat during overrun, even when being used under conditions where the rotational speed changes greatly.

THE PREFERRED EMBODIMENTS TO WORK THE INVENTION

Figure 1:
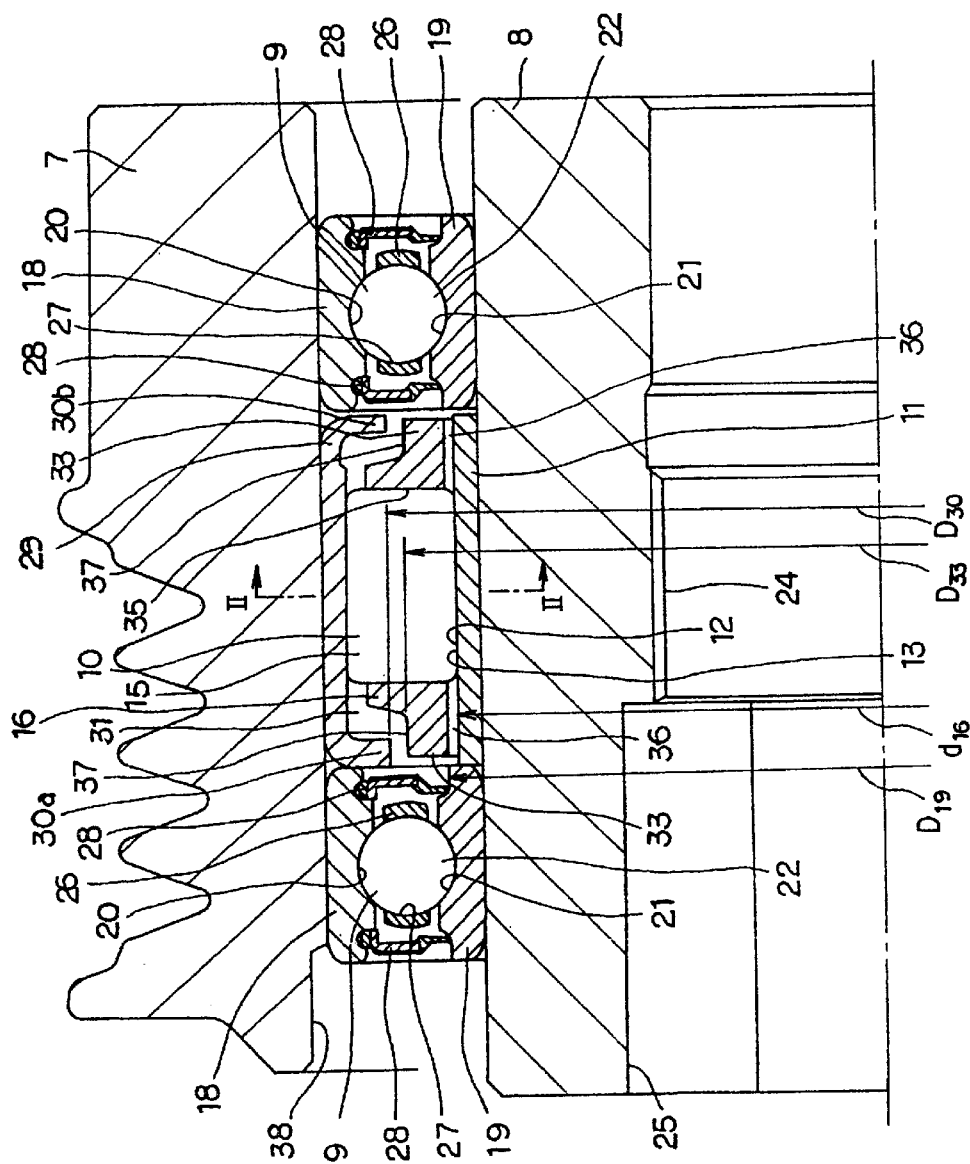
FIG. 1 is a cross sectional view of a half of one example of the embodiment of the invention.
Figure 2:
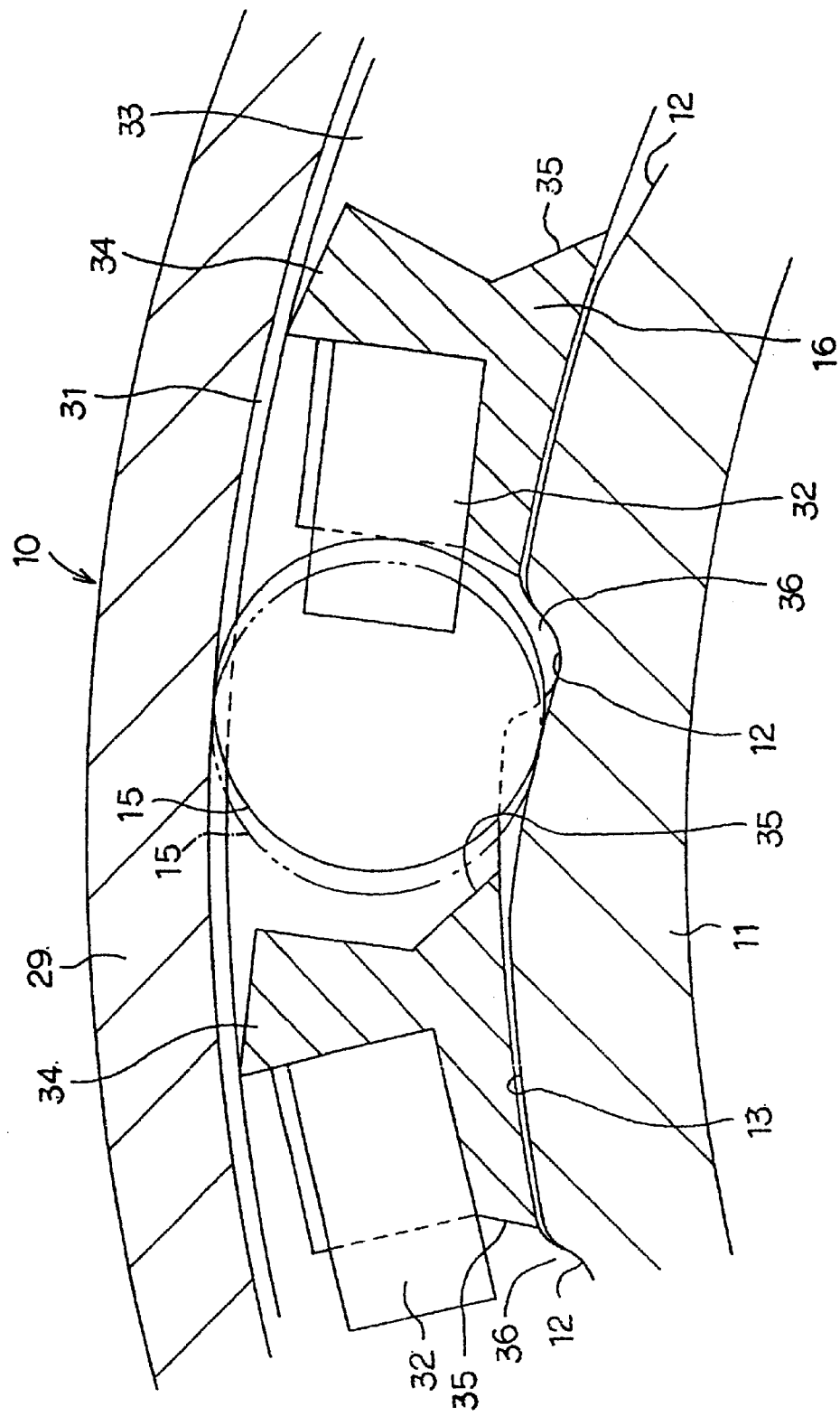
FIG. 2 is an enlarged cross sectional view taken along the line II—II in FIG. 1 and partly cut-away.

FIG. 1 and FIG. 2 show one example of an example of the embodiment of this invention. The like code numbers are given to like parts throughout the explanation of this invention.

Figure 3:
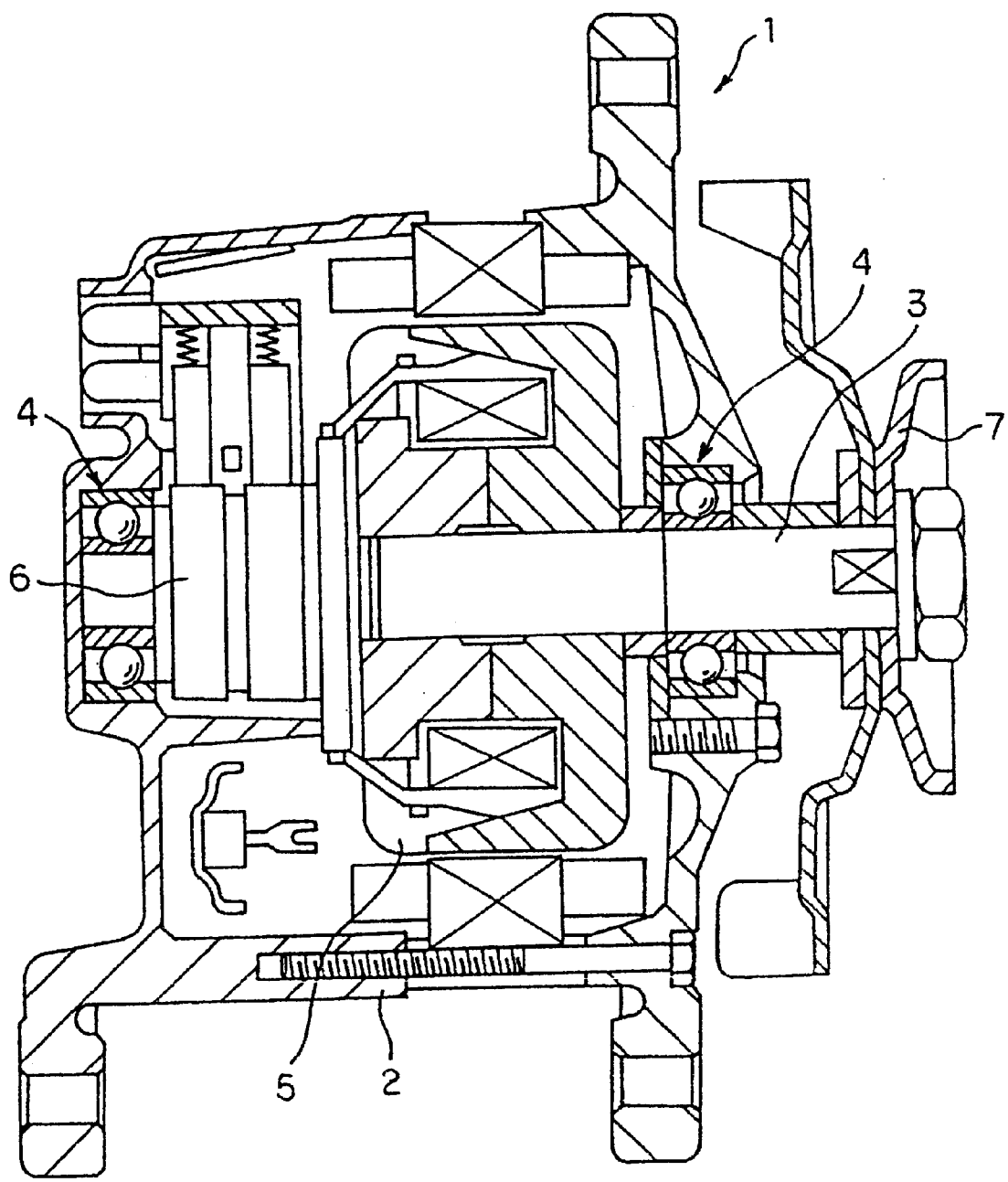
FIG. 3 is a cross sectional view to show one example of the conventional alternator.

The pulley apparatus with built-in one-way clutch of this example comprises a generally cylindrical-shaped sleeve 8 that is fitted onto and fixed around the end of the rotating shaft 3 (see FIG. 3) of the alternator, and a pulley 7 that is located around the sleeve 8 such that it is concentric with the sleeve 8. The sleeve 8 rotates together with the rotating shaft 3.

In the example shown in the figures, a female screw section 24 is formed around the inner peripheral surface in the middle section of the sleeve 8, and this female screw section 24 screws onto a male screw section (not shown in the figures) that is formed around the outer peripheral surface on the end of the rotating shaft 3. Instead of using a screw as the construction for preventing relative rotation between the rotating shaft 3 and the sleeve 8, it is also possible to use a spline connection, non-cylindrical fit, key connection or the like. Also, in order to simplify the work of screwing together the female screw section 24 with the male screw section, a hexagonal hole section 25 in which a tool such as the tip end of a hexagonal wrench can fit in, is formed on the inner peripheral surface on one end of the (left end in FIG. 1) of the sleeve 8.

A pair of support bearings 9 and the one-way clutch 10 are installed in the pulley 7 that is located around the sleeve 8. Also, the outer peripheral surface of a half (left half in FIG. 1) of the pulley 7 is formed such that it has a wave-shaped cross-section in the width direction so that part of an endless belt 23 (see FIG. 4), called a poly V-belt, can be placed over it.

In the case of this example, there is a pair of support bearings 9, which are deep-groove ball bearings, and a one-way clutch 10, which is a roller clutch, located between the outer peripheral surface of the sleeve 8 and the inner peripheral surface of the pulley 7. Of these, each of the support bearings 9 comprises: an inner bearing race 19 having a deep-groove inner-ring raceway 21 formed around its outer peripheral surface; an outer bearing race 18 having an outer-ring raceway 20 formed around its inner peripheral surface; and a plurality of rolling elements (balls) 22 that are located between the inner-ring raceway 21 and the outer-ring raceway 20 such that they rotate freely. In addition, the outer bearing races 18 are fitted around and attached to the inner peripheral surface closer to both ends of the pulley 7 through interference fit, and the inner bearing races 19 are fitted around and attached to the outer peripheral surface closer to both ends of the sleeve 8 through interference fit.

Moreover, the rolling elements 22 are held in a plurality of pockets 27 that are formed in a generally cylindrical-shaped retainer 26 such that they rotate freely. There are also seal rings 28 that are located between the outer peripheral surface on both ends of each of the inner bearing races 19 and the inner peripheral surface on both ends of each of the outer bearing races 18. In other words, the outer peripheral edges of the seal rings 28 are fixed to the inner peripheral surface on both ends of the outer bearing races 18, and the tip edges of the seal lips that are formed on the inner peripheral edges of the seal rings 28 come in sliding contact with the outer peripheral surface on both ends of the inner bearing races 19. These seal rings 28 prevent foreign matter from getting in from the outside into the space where the plurality of rolling elements 22 are located, and also prevent grease inside the support bearings 9 from leaking out.

Furthermore, in order to construct the one-way clutch 10, an inner ring 11 for the one-way clutch is fitted onto and fastened to the outer peripheral surface in the middle section in the axial direction of the sleeve 8 through interference fit. This inner ring 11 for the one-way clutch is formed in a generally cylindrical shape from a sheet material of hard metal such as bearing steel or of carburized steel such as SCM415, and its outer peripheral surface functions as a cam surface 13.

On the other hand, there is an outer ring 29 for the one-way clutch that is fitted into and fastened to the inner peripheral surface in the middle section in the axial direction of the pulley 7 through interference fit. The outer ring 29 for the one-way clutch is formed in a generally cylindrical shape by pressing a hard metal sheet such as bearing steel, or a carburized steel sheet such as SCM415, and has inward facing flange-shaped collar sections 30a, 30b on both ends in the axial direction.

Of these collar sections 30a, 30b, the collar sections 30a (left collar section in FIG. 1) is formed before assembling it with the other components, so it has the same thickness as the main portion of the outer ring 29 for the one-way clutch. On the other hand, the other collar section 30b (right collar section in FIG. 1) is formed after it has been assembled with the other components, so it is thin. The outside surfaces in the axial direction of these collar sections 30a, 30b come in contact with the inner end surfaces of the inner bearing races 18 of the support bearings 9 or face them through a very small gap.

Also, there are some concave sections 12 that run along the axial direction on the inner ring 11 for the one-way clutch at a plurality of uniformly spaced locations in the circumferential direction around the outer peripheral surface of the inner ring 11 for the one-way clutch, whose depth changes in the radial direction such that it gets larger toward a specified circumferential direction. These concave sections 12 are called ramp sections. The outer peripheral surface of the inner ring 11 for the one-way clutch functions as the cam surface 13.

There is a cylindrical-shaped space 31 formed between the outer peripheral surface of the inner ring 11 for the one-way clutch and the inner peripheral surface of the outer ring 29 for the one-way clutch, and of the dimensions of this cylindrical-shaped space 31, the width size in the radial direction of the outer ring 29 and inner ring 11 for the one-way clutch, at the sections that correspond to the deepest part of the concave sections 12, is greater than the outer diameter of the plurality of rollers 15 that are located in this cylindrical space 31, and at the sections away from the concave sections 12, the width size is less than the outer diameter of the rollers 15.

The one-way clutch 10 comprises a clutch retainer 16 that is made of a synthetic resin and formed into a cylindrical cage shape, a plurality of rollers 15, and a plurality of springs 32, which are located between the inner peripheral surface of the outer ring 29 and the outer peripheral surface of the inner ring 11 for the one-way clutch.

The clutch retainer 16 comprises a pair of ring-shaped rim sections 33, and a plurality of column sections 34 that connect the rim sections 33 to each other.

In the case of this example, stepped sections 37 are formed around the outer peripheral surface of the outer half in the axial direction of the rim sections 33, and the outer diameter of these stepped sections 37 is less than the outer diameter of the portions of the rim sections 33 that are further inside in the axial direction than the stepped sections 37. In addition, the rollers 15 are held in a plurality of pockets 35 that are generally defined by the inside surfaces of the rim sections 33 and the side surfaces of the column sections 34, such that the rollers 15 can roll freely and move freely a little in the circumferential direction in the pockets 35, respectively.

Also, convex sections 36 are formed at a plurality of locations in the circumferential direction on the inner peripheral surfaces of the rim sections 33, such that they are engaged with the concave sections 12 that are formed on the outer peripheral surface of the inner ring 11 for the one-way clutch.

The clutch retainer 16 is installed on the inner ring 11 for the one-way clutch such that it cannot rotate with respect to the inner ring 11 for the one-way clutch. Also, the springs 32 are located between the column sections 34 of the clutch retainer 16 and the rollers 15, and they elastically press the rollers 15 in the same direction in the circumferential direction (left direction in FIG. 2).

Moreover, in the case of this example, the length in the axial direction of both the outer ring 29 and inner ring 11 for the one-way clutch are about the same. Also, the length in the axial direction of the clutch retainer 16 is only a little shorter than the lengths in the axial direction of the outer ring 29 and inner ring 11 for the one-way clutch.

The one-way clutch 10 that is constructed as described above is located in the section between the inner peripheral surface of the middle section in the axial direction of the pulley 7 and the outer peripheral surface of the middle section in the axial direction of the sleeve 8.

First, the convex sections 36 that are formed on the inner peripheral surface of the clutch retainer 16 are engaged with the concave sections 12 on the cam surface 13 that is formed on the outer peripheral surface of the inner ring 11 for the one-way clutch.

Next, one roller 15 is placed in each of the pockets 35 that are formed in the clutch retainer 16, and in that state, the outer ring 29 for the one-way clutch is placed around the clutch retainer 16 and the rollers 15. Also, in this state, the edges on both ends in the axial direction of the clutch retainer 16 are such that they do not protrude out further in the axial direction than the edges on both ends of the inner ring 11 for the one-way clutch.

Moreover, in this state, the surface of the tip end of a jig presses both the edge of one end in the axial direction of the outer ring 29 for the one-way clutch and the edge of one end in the axial direction of the inner ring 11 for the one-way clutch, and pushes the outer ring 29 for the one-way clutch into the inner peripheral surface of the middle section in the axial direction of the pulley 7, while at the same times pushes the inner ring 11 for the one-way clutch onto the outer peripheral surface of the middle section in the axial direction of the sleeve 8. In addition, when pressing in this way, the surface of the tip end of the jig is located on an imaginary plane that is orthogonal to the direction that it presses against the outer ring 29 and inner ring 11 for the one-way clutch.

Moreover, in the state where the outer ring 29 for the one-way clutch is fitted and fixed into the inner peripheral surface of the middle section of the pulley 7, and the inner ring 11 for the one-way clutch is fitted and fixed onto the outer peripheral surface of the middle section of the sleeve 8, one end edge in the axial direction of the outer ring 29 for the one-way clutch and one end edge in the axial direction of the inner ring 11 for the one-way clutch, which are pressed by the tip end of the aforementioned jig, are located on an imaginary plane that orthogonally crosses the center axis of the pulley 7 and sleeve 8.

Particularly, in the case of this invention, the inner diameter $D_{30}$ of the collar sections 30a, 30b that are formed on both ends in the axial direction of the outer ring 29 for the one-way clutch is greater than the outer diameter $D_{33}$ of the outside end in the axial direction of the rim sections 33 of the clutch retainer 16 that are positioned on the same sides as these collar sections 30a, 30b ($D_{30}>D_{33}$). In this example, the clearance in the radial direction between the inner peripheral surface of the collar sections 30a, 30b and the outer peripheral surface of the outside end sections in the axial direction of the rim sections 33 is 0.5 mm or greater, such that there is no large shearing force on the grease existing within this clearance.

Furthermore, in the case of this invention, the diameter ($d_{16}$) of the inscribed circle (inscribed circle of the tip end of the convex sections 36) on the inner peripheral surface on both ends in the axial direction of the clutch retainer 16 of the one-way clutch 10 is less than the outer diameter ($D_{19}$) of both ends in the axial direction of the inner bearing races 19 ($d_{16}<D_{19}$). Accordingly, the ends near the inner diameter of both sides in the axial direction of the clutch retainer 16 (convex sections 36) face the surface of one end in the axial direction of the inner bearing races 19, respectively.

Also, in the case of this invention, the length in the axial direction of the space formed between the surface on one side of the axially inner half of the rim sections 33 that are formed on both ends in the axial direction of the clutch retainer 16 and the inside surfaces of the collar sections 30a, 30b is sufficiently large with respect to the length in the axial direction of the space that is formed between the end sections near the inner diameter of the both side surfaces in the axial direction of the clutch retainer 16 and the end surface on one side in the axial direction of the inner bearing races 19.

Therefore, there is no contact between part of the clutch retainer 16 and part of the outer ring 29 for the one-way clutch which is rotated relative to the clutch retainer 16 when the one-way clutch 10 is in overrun, before the one side surface in the axial direction of the clutch retainer 16 comes in contact with the one end surface in the axial direction of the inner bearing races 19. Also, since the clearance in the axial direction that is formed between the one side surface of the clutch retainer 16 and the one side surface of the outer ring 29 for the one-way clutch is 0.5 mm or greater, there is no large shearing force on the grease inside this clearance.

In the pulley apparatus with built-in one-way clutch of this invention, constructed as described above, the one-way clutch 10 transmits only rotational force in a specified direction between the pulley 7 which the outer ring 29 for the one-way clutch is fitted onto and fixed to, and the rotating shaft 3 which the sleeve 8 is fitted onto and fixed to.

For example, in FIG. 2, provided that the inner ring 11 for the one-way clutch is fixed while only the outer ring 29 for the one-way clutch rotates, in the case that the outer ring 29 for the one-way clutch rotates in the clockwise direction of FIG. 2, the rollers 15 oppose the force of the springs 32 due to the force they receive from the inner peripheral surface of the outer ring 29 for the one-way clutch, and as shown by the solid line in FIG. 2, the rollers 15 tend to move toward the deep side of the concave sections 12. Also, the rollers 15 are in a state in which they are able to rotate inside the cylindrical space 31, so rotational force is not transmitted between the outer ring 29 and inner ring 11 for the one-way clutch. This is the so-called overrun state.

Conversely, when the outer ring 29 for the one-way clutch rotates in the counterclockwise direction of FIG. 2, the rollers 15 bite into shallow side of the concave sections 12 in a wedge shape due to the force received from the inner peripheral surface of the outer ring 29 for the one-way clutch and the resilient force of the springs 32, as shown by the dot-dash line in FIG. 2. Also, the outer ring 29 and inner ring 11 for the one-way clutch are joined as one body, and rotational force is freely transmitted between the outer ring 29 and the inner ring 11 for the one-way clutch. This is the so-called locked state.

By repeating these functions, the direction of the stress acting on the section of rubbing between the endless belt 23, which extends around the pulley 7, and the pulley 7 becomes constant, and it is possible to prevent slipping between the endless belt 23 and the pulley 7, as well as it is possible to prevent a decrease in the life of the endless belt 23. Moreover, when the number of revolution of the engine decreases and the running speed of the endless belt 23 decreases, there is relative rotation between the sleeve 8 and the pulley 7. This is the over run state. Therefore, regardless of changes in the number of revolution of the engine, it is possible to keep the rotating shaft 3 of the alternator rotating a somewhat high rpm due to the rotational inertia force of the rotating shaft 3 itself and as well as the rotor 5 or commutator 6 (see FIG. 3) that are fastened to the rotating shaft 3, and thus it is possible to improve the generating efficiency of the alternator.

Particularly, with the pulley apparatus with a built-in one-way clutch for an alternator of this invention, when there is relative rotation between the sleeve 8 and the pulley 7 during overrun, it is possible to control the displacement in the axial direction of the clutch retainer 16 by the inner bearing races 19 of the support bearings 9.

Also, during overrun, by having the clutch retainer 16 rotate relative to the pulley 7 while at the same time displace greatly in the axial direction, it is possible to prevent strong rubbing between the both side surfaces in the axial direction of the clutch retainer 16 and the members (for example the seal rings 28) that face both of the side surfaces in the axial direction and rotate relative to the clutch retainer 16. When heat due to this kind of rubbing becomes large, there is a possibility that the clutch retainer 16 or the members that come in contact with the clutch retainer 16 thermally deform, and that the lubrication grease inside the clutch retainer 10 will thermally degrade.

In the case of this invention, it is possible to prevent this kind of problem without forming the clutch retainer 16 in a special shape, and thus it is possible to sufficiently maintain the durability of the pulley apparatus with built-in one-way clutch for an alternator.

Furthermore, in the case of this invention, there is a pair of collar sections 30a, 30b formed on both ends in the axial direction of the outer ring 20 for the one-way clutch such that they protrude toward the inner-diameter side. Therefore, it is possible to handle the components of the one-way clutch 10 substantially as one body before assembling the one-way clutch 10 in the pulley apparatus. In other words, the collar sections 30a, 30b prevent the clutch retainer 16 and the plurality of rollers 15 from falling out from the section between the inner peripheral surface of the outer ring 29 and the outer peripheral surface of the inner ring 11 for the one-way clutch. Moreover, since it becomes easy to handle the one-way clutch 10, assembling of the pulley apparatus with a built-in one-way clutch for an alternator is improved. Furthermore, in the case of this invention, there is a cam surface 13 on the outer peripheral surface of the inner ring 11 for the one-way clutch. Therefore, the locked state and overrun state are achieved stable even when it is assembled and used in an alternator where there are large changes of rotational speed during operation.

Also, in the case of this example, the length in the axial direction of the clutch retainer 16 is a little shorter than the length in the axial direction of the outer ring 29 and inner ring 11 for the one-way clutch, so the both end edges in the axial direction of the clutch retainer 16 does not protrude outward further than the both end edges of the inner ring 11 and outer ring 29 for the one-way clutch. Therefore, it is possible to prevent objects from hitting against the end of the clutch retainer 16 made of synthetic resin and damaging the clutch retainer 16 before the one-way clutch 10 is assembled in the pulley 7.

Furthermore, in the case of this example, the tip end of a jig simultaneously presses against the one end edge of the ends of the outer ring 29 and inner ring 11 for the one-way clutch when installing the one-way clutch 10 in the section between the inner peripheral surface of the pulley 7 and the outer peripheral surface of the sleeve 8, so as to simultaneously pressure-fit both of these members. Also, when the outer ring 29 for the one-way clutch is fitted and fixed inside the pulley 7 and the inner ring 11 for the one-way clutch is fitted and fixed around the sleeve 8, the one end edge in the axial direction of the outer ring 29 and inner ring 11 for the one-way clutch are located on an imaginary plane that orthogonally crosses the center axis of the pulley 7 and sleeve 8.

Figure 4:
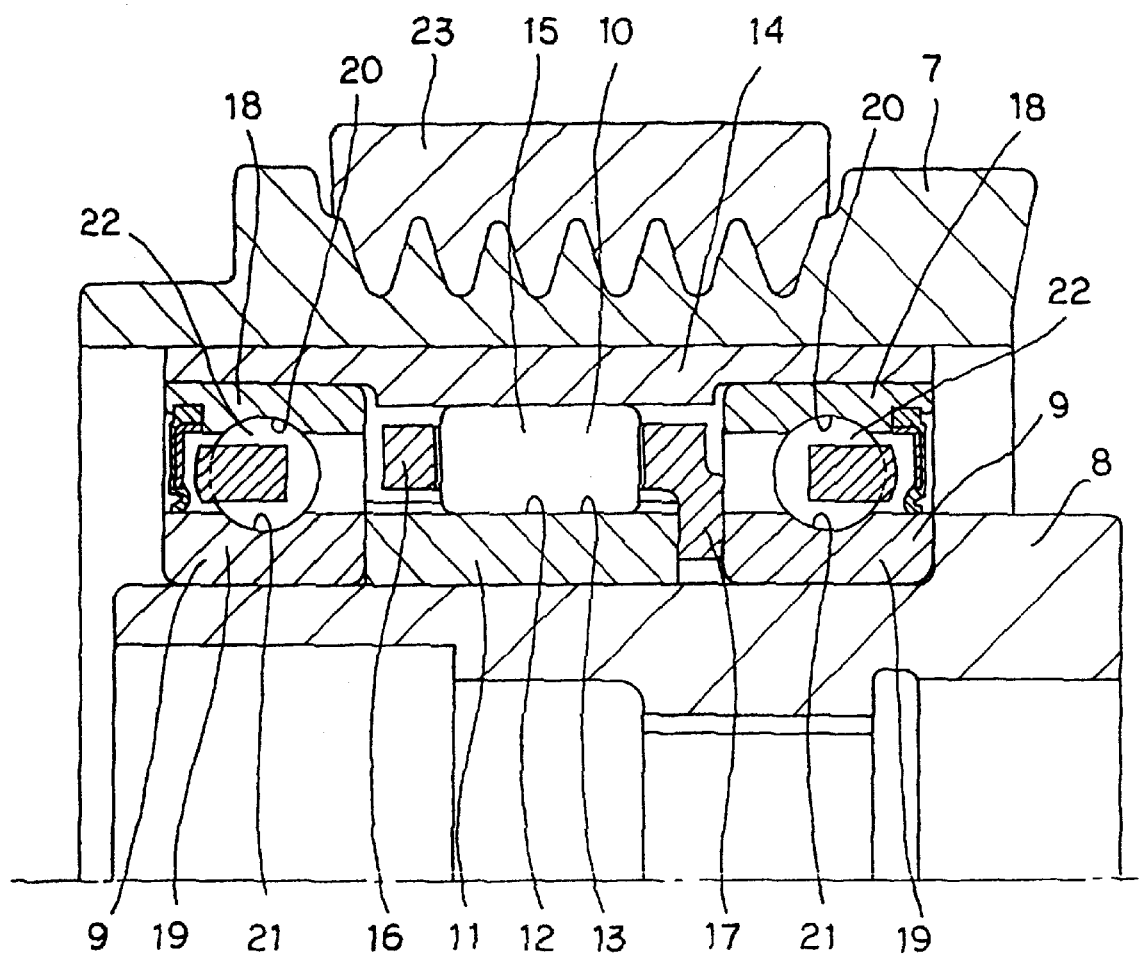
FIG. 4 is a cross sectional view of one example of the conventional pulley apparatus with built-in one-way clutch for the alternator.

In contrast to this, in the prior art construction shown in FIG. 4, the outer ring 14, part of which serves as the outer ring for the one-way clutch, and the inner ring 11 for the one-way clutch substantially differ from each other in the lengths in the axial direction, so it is difficult to simultaneously pressure-fit the outer ring 14 around the inner peripheral surface of the pulley 7 and the inner ring 11 for the one-way clutch around the outer peripheral surface of the sleeve 8.

Differing from the case of this invention, it is possible to form the pair of collar sections 30a, 30b on both ends in the axial direction of the outer ring 29 for the one-way clutch such that they protrude toward the inner-diameter side, as well as form a convex engagement section, on part of the inner peripheral surface on one end in the axial direction of the clutch retainer such that it protrudes toward the inner-diameter side, and this convex engagement section can be held between the inner ring 11 for the one-way clutch and the inner bearing race 19.

In this case, part of the surface on one side in the axial direction of the inner ring 11 for the one-way clutch is covered by this convex engagement section. Also, in this case, the area of the portion where the jig comes in contact with the one side surface of the inner ring 11 for the one-way clutch mostly disappears. Therefore, it is difficult that the tip end surface of the jig comes in contact with the outer ring 29 and inner ring 11 for the one-way clutch from the side where the convex engagement section is located, in order to simultaneously pressure-fit the outer ring 29 for the one-way clutch around the inner peripheral surface of the pulley 7, and the inner ring 11 for the one-way clutch around the outer peripheral surface of the sleeve 8. Therefore, when the direction of pressure-fitting of the one-way clutch is limited to the direction from the side where the convex engagement section is formed, it is necessary to separately pressure-fit the outer ring 29 and inner ring 11 for the one-way clutch with the jig.

However, when pressure-fitting is applied separately on the outer ring 29 and inner ring 11 for the one-way clutch as described above, there is a possibility that the clutch retainer could be damaged. In other words, when pressure-fitting is applied on the outer ring 29 (or the inner ring 11) for the one-way clutch before pressure-fitting is applied on the inner ring 11 (or outer ring 29) for the one-way clutch, it becomes difficult to apply pressure-fitting on the inner ring 11 (or outer ring 29) for the one-way clutch while at the same time checking the positional relationship between the outer ring 29 and inner ring 11 for the one-way clutch. Therefore, the pressure-fitting of the inner ring 11 (or outer ring 29) for the one-way clutch with respect to the pressure-fitting of the outer ring 29 (or inner ring 11) for the one-way clutch becomes excessive, and there is a possibility that the end of the clutch retainer that is fastened to the outer peripheral surface of the inner ring 11 for the one-way clutch come in strong contact with part of the outer ring 29 for the one-way clutch. In that case, there is a possibility that part of the clutch retainer could be damaged.

In the case of this embodiment, it is possible to simultaneously apply pressure for fitting to the outer ring 29 and inner ring 11 for the one-way clutch from any side and fit them around the inner peripheral surface of the pulley 7 and around the outer peripheral surface of the sleeve 8, respectively, and to prevent damage to the clutch retainer 16.

Also, in the case of this embodiment, the outer peripheral surface of the sleeve 8 is a simple cylindrical surface over the entire axial length. However, it is possible to make the outer diameter of the middle section in the axial direction of the outer peripheral surface of this sleeve 8, where the inner ring 11 for the one-way clutch is fitted for fixing, about 0.1 to 0.2 mm larger than the outer diameter of the sections near both of the ends in the axial direction. By doing so, it is possible to reduce the length for interference fit of the inner ring 11 for the one-way clutch with respect to the outer peripheral surface of the sleeve 8, and thus simplify the work of pressure-fitting the inner ring 11 for the one-way clutch. As a result, it is possible to reduce the cost necessary for performing the work of pressure-fitting the inner ring 11 for the one-way clutch.

Furthermore, in this case, it is possible to prevent the section of the outer peripheral surface near both ends in the axial direction of the sleeve 8, onto which the inner bearing races 19 of the support bearings 9 are fitted, from being bit into when pressure fitting the inner ring 11 for the one-way clutch. Also, it is possible to sufficiently maintain the shape precision of the section on the outer peripheral surface near both ends in the axial direction of the sleeve 8, onto which the inner bearing races 19 are fitted, and thus it is possible to prevent play in the fit between the outer peripheral surface of the sleeve 8 and the inner peripheral surface of the inner bearing races 19, and also prevent the inner bearing races 19 from becoming impossible to fit in place.

Also, in the case of this example, a large-diameter section 38 is formed around the inner peripheral surface on one end (left end in FIG. 1) of the pulley 7 such that its diameter is greater than the outer diameter of the outer bearing races 18 of the support bearings 9. Also, of the pair of support bearings 19, the outer bearing race 18 of one of the support bearings 9 (left bearing in FIG. 1) is fitted around the inner peripheral surface of the pulley 7 in the section that is further on the inside in the axial direction than the large-diameter section 38. As described above, the outer bearing race 18 of one of the support bearings 19 is tightly fitted around the inner peripheral surface near one end of the pulley 7 through interference fit, and the inner bearing race 19 is tightly fitted around the outer peripheral surface near one end of the sleeve 8 through interference fit.

In the case of this example of forming a large-diameter section 38 around the inner peripheral surface on one end of the pulley 7 as described above, it is possible to reduce the length of the fit between the outer bearing race 18 and the inner peripheral surface of the pulley 7. Therefore, it is possible to simplify the work of pressure-fitting the support bearings 9.

Furthermore, it is possible to reduce the percentage of change in volume due to pressure-fitting of the space whose volume is reduced when sealed, and thus it is possible to reduce a rise in pressure in this space. In other words, it is possible to prevent the pressure in the space between the pair of support bearings 9 where the roller clutch 10 is located, which is tightly sealed at both ends in the axial direction by the seal rings 28 installed in both support bearings 9, from increasing excessively during the pressure fitting work. Therefore, it is possible to prevent the edges on the tip ends of the seal rings 28, that are installed in the support bearings 9, from rolling up.

INDUSTRIAL APPLICABILITY

The pulley apparatus with built-in one-way clutch for an alternator of this invention, is constructed and function as described above, so it is possible to prevent thermal degradation of grease that is filled inside the apparatus and maintain the lubricated state of the one-way clutch over a long period of time, as well as it is possible to prevent thermal deformation of the components of the apparatus. As a result, it is possible to sufficiently maintain the durability of the pulley apparatus with built-in one-way clutch for an alternator. Furthermore, handling of the one-way clutch before assembling it in the pulley apparatus is simplified, thus improving assembling of the apparatus. The pulley apparatus with built-in one-way clutch of this invention is not limited to the case shown in the figures where it is assembled in the rotating shaft section of an alternator, which is the following side, and can be applied to the case where it is assembled in the crankshaft section, which is the drive side.

What is claimed is:

1. A pulley apparatus with built-in one-way clutch comprising: a sleeve adapted to be connected and fastened to a tip end of a rotating shaft; a pulley located around the sleeve such that it is concentric with the sleeve; a one-way clutch located in the space between the middle section in the axial direction of the outer peripheral surface of the sleeve and the middle section in the axial direction of the inner peripheral surface of the pulley such that it can transmit rotating power between the pulley and sleeve only when the pulley is inclined to rotate in a predetermined direction relative to the sleeve; and a pair of support bearings each having a seal on either axial side and located on both sides in the axial direction of the one-way clutch between the outer peripheral surface of the sleeve and the inner peripheral surface of the pulley to support the radial load applied to the pulley and make it possible for the sleeve and pulley to rotate with respect to each other, the one-way clutch being a roller clutch comprising: an outer ring for the one-way clutch fitted into and fixed around the inner peripheral surface in the middle section in the axial direction of the pulley; an inner ring for the one-way clutch fitted onto and fixed around the outer peripheral surface in the middle section in the axial direction of the sleeve; and a plurality of rollers held by a clutch retainer between the outer ring and inner ring for the one-way clutch, the support bearings having inner bearing races fitted onto and fixed around the outer peripheral surfaces on both end portions in the axial direction of the sleeve, wherein the diameter of the inscribed circle of the inner peripheral surface on both ends in the axial direction of the clutch retainer is less than the outer diameter of one of the end surfaces in the axial direction of the inner bearing races that faces the clutch retainer.

2. A pulley apparatus with built-in one-way clutch comprising: a sleeve adapted to be connected and fastened to a tip end of a rotating shaft; a pulley located around the sleeve such that it is concentric with the sleeve; a one-way clutch located in the space between the middle section in the axial direction of the outer peripheral surface of the sleeve and the middle section in the axial direction of the inner peripheral surface of the pulley such that it can transmit rotating power between the pulley and sleeve only when the pulley is inclined to rotate in a predetermined direction relative to the sleeve; and a pair of support bearings each having a seal on either axial side and located on both sides in the axial direction of the one-way clutch between the outer peripheral surface of the sleeve and the inner peripheral surface of the pulley to support the radial load applied to the pulley and make it possible for the sleeve and pulley to rotate with respect to each other, the one-way clutch being a roller clutch comprising: an outer ring for the one-way clutch fitted into and fixed around the inner peripheral surface in the middle section in the axial direction of the pulley; the outer ring for the one-way clutch having a pair of collar sections formed on both ends in the axial direction to protrude to the inner-diameter side, respectively; an inner ring for the one-way clutch fitted onto and fixed around the outer peripheral surface in the middle section in the axial direction of the sleeve; the inner ring for the one-way clutch having an outer peripheral surface such that a cam surface is defined on the outer peripheral surface by a plurality of concave grooves formed such that the depth in the radial direction becomes larger toward a specified circumferential direction; and a plurality of rollers held by a clutch retainer between the outer ring and inner ring for the one-way clutch, the support bearings having inner bearing races fitted onto and fixed around the outer peripheral surfaces on both ends in the axial direction of the sleeve, wherein the inner diameters of the collar sections of the outer ring for the one-way clutch are larger than the outer diameter of the end in the axial direction of the clutch retainer located on the same side as the collars, and wherein the diameter of the inscribed circle of the inner peripheral surface on both ends in the axial direction of the clutch retainer is less than the outer diameter of one of the end surfaces in the axial direction of the inner bearing races that faces the clutch retainer.

* * * * *